Sept. 28, 1937. G. F. BURNETT ET AL 2,094,445
FLUID METER
Filed Jan. 21, 1937 3 Sheets-Sheet 3
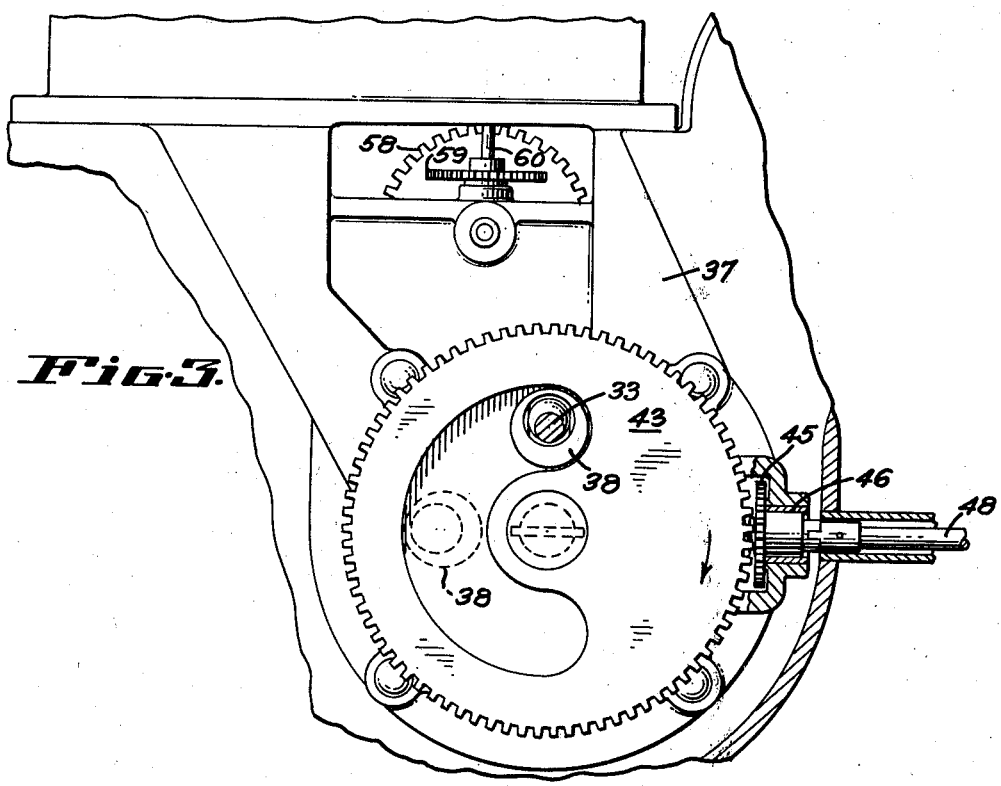
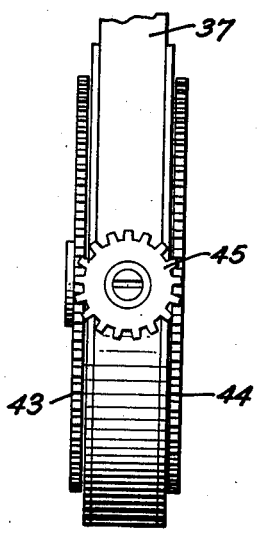
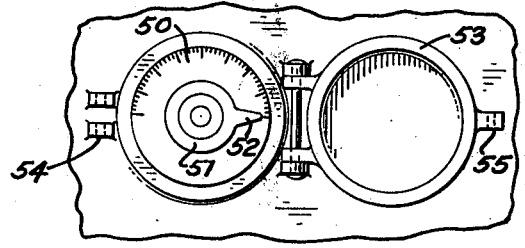
INVENTOR.
George F. Burnett
Howard E. Ward
BY Oscar A. Mellin
ATTORNEY.

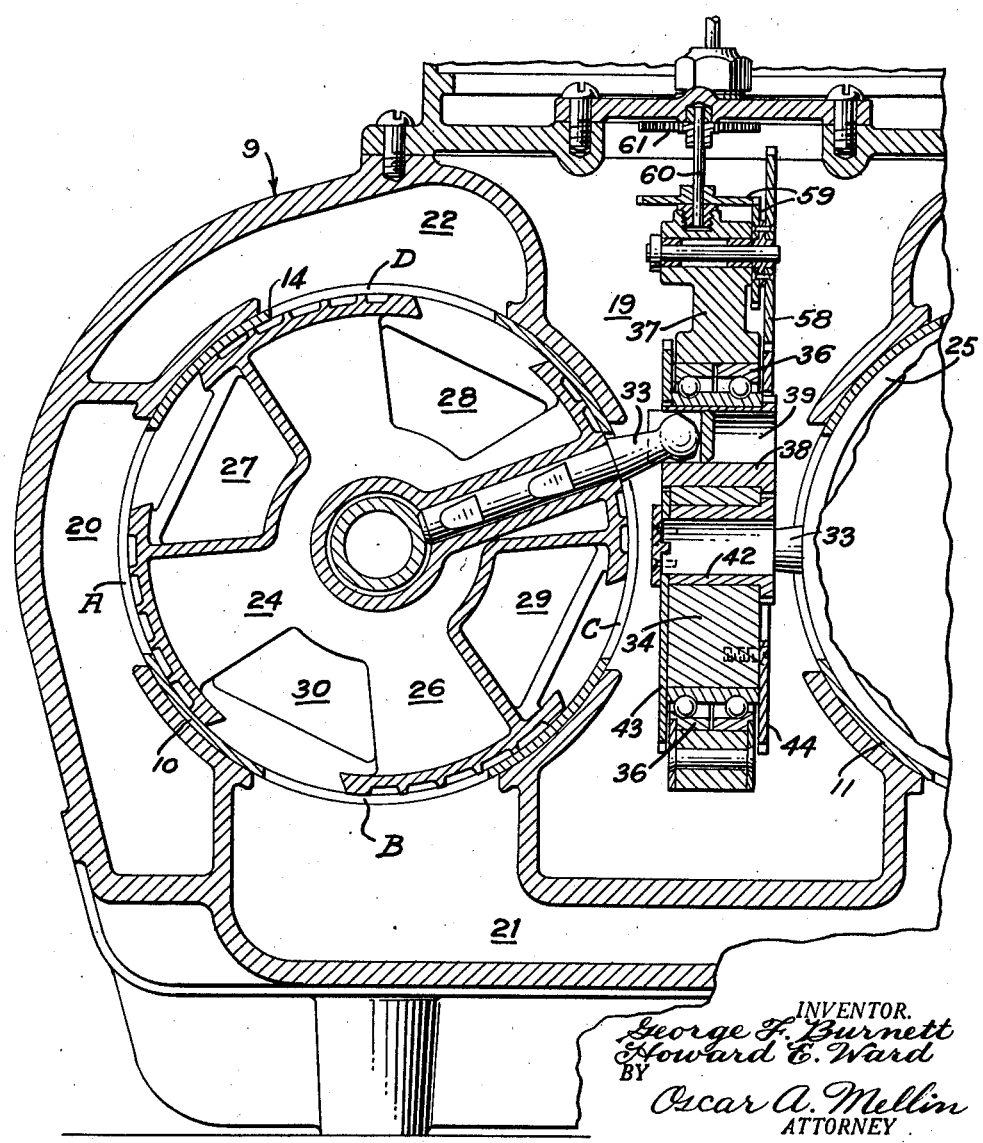

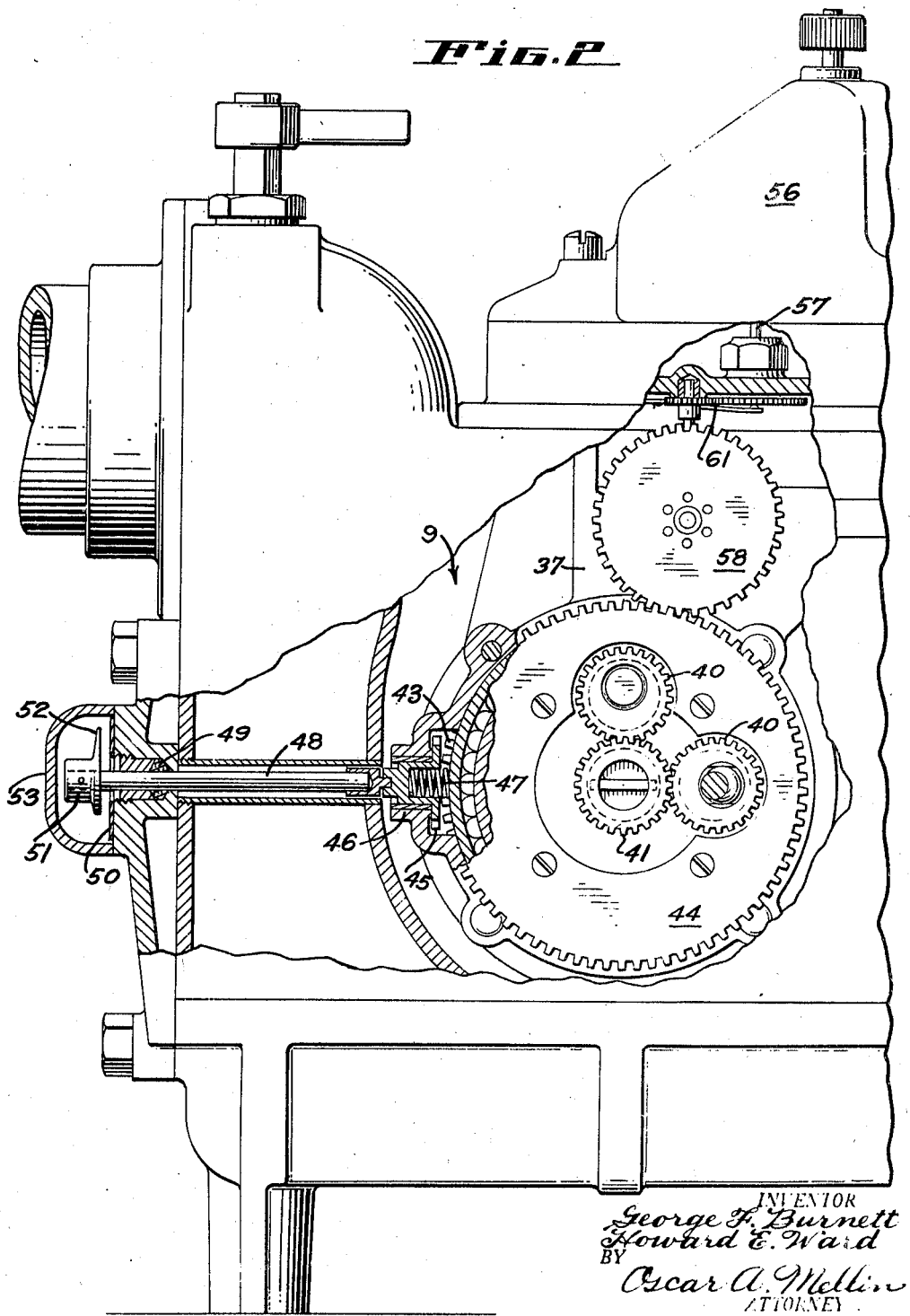

Patented Sept. 28, 1937

2,094,445

UNITED STATES PATENT OFFICE 2,094,445

FLUID METER

George F. Burnett, Chicago, Ill., and Howard E. Ward, Berkeley, Calif., assignors to Ralph N. Brodie Company, Oakland, Calif., a corporation of California Application January 21, 1937, Serial No. 121,444

7 Claims. (Cl. 73—242)

This invention relates to fluid meters of the displacement type such as disclosed in United States Letters Patent No. 1,895,318, issued January 24, 1933.

It is the principal object of the present invention to generally improve the construction and operation of meters of the character referred to by providing a meter of the reciprocating piston type which is compact and simple in construction, which will operate efficiently under all operating conditions to accurately measure the volume of fluid passing therethrough and which may be easily and quickly calibrated.

In carrying the invention into practice I provide a meter casing including a pair of cylinders arranged in parallelism, each of which is fitted with a reciprocable and oscillatory piston. Positioned intermediate the cylinders within the casing is a rotatable synchronizing member. Each piston is fitted with a crank arm connected to an eccentric point on the synchronizing member so that reciprocation of the pistons will result in oscillation thereof and in rotation of the synchronizing member. The points of connection between the cranks of the pistons and the synchronizing member are so relatively positioned that the pistons will operate in synchronism and in overlapping cycles. Inasmuch as the operation of the pistons results in rotary movement of the synchronizing member, this motion is utilized to drive an indicating or counting mechanism so as to translate the movement of the pistons into quantities of fluid displaced thereby. The synchronizing member is fitted with adjustment mechanism which may be operated from the exterior of the meter casing so as to simultaneously change the position of the crank arm connections between the pistons and the center of revolution of the synchronizing member so as to vary the length of the strokes of the pistons. By adjusting the strokes of the pistons, the displacement thereof is of course, varied, and by this medium the meter is calibrated.

One form which the invention may assume is exemplified in the following description and illustrated by way of example in the accompanying drawings, in which:

Fig. 1 is a fragmentary view in transverse section taken centrally through the meter.

Fig. 2 is a fragmentary view in side elevation of the meter with parts of the meter casing broken away to show portions of the adjustment mechanism in section and portions in elevation.

Fig. 3 is a fragmentary view in longitudinal section through the meter showing certain details of construction of the adjustment mechanism.

Fig. 4 is a fragmentary view in elevation showing the manner in which the adjusting pinion engages the adjusting gears on the synchronizing member to calibrate the meter.

Fig. 5 is a fragmentary view in elevation showing the calibrated dial mounted on the exterior of the meter for cooperation with the adjustment mechanism.

Referring more particularly to the accompanying drawings, 9 indicates a fluid meter of the type disclosed in United States Letters Patent No. 1,895,318, issued January 24, 1933. This meter is of the displacement type and is adapted to be interposed in a pipe line to measure and indicate the volume of fluid passing therethrough. The meter in the present instance includes a meter casing formed with a pair of parallel cylinders 10 and 11, the ends of which are enclosed by suitable head members bolted or otherwise suitably connected to the casing. The cylinders 10 and 11 are arranged in parallelism with the longitudinal center of the meter casing and are spaced at equal distances on opposite sides of the center thereof as illustrated.

Each cylinder is fitted with a liner 14, and the liners of the two cylinders are also identical in construction and each is formed with four ports A, B, C, and D, the ports A and C being in transverse alignment while the ports B and D are in vertical alignment. The ports A and C of each cylinder are located on the transverse center line of the cylinder, while the ports B and D are located on the vertical center line of the cylinder. The ports are, of course, as illustrated, spaced ninety degrees apart.

The meter casing is formed with intake chambers 19 and 20 which communicate with the ports A and C, and is formed with outlet chambers 21 and 22 which communicate with the ports B and D. The inlet chambers 19 and 20 are connected with an inlet port at one end of the meter casing and adapted to be connected to a pipe line, while the outlet chambers 21 and 22 are connected with an outlet port at the opposite end of the meter casing, also adapted to be connected with the pipe line, all in the manner illustrated and described in the aforesaid Letters Patent of the United States.

The outlet and inlet chambers are not in communication with each other except through the medium of the cylinders 10 and 11 and their ports A, B, C, and D. This communication is so controlled by pistons 24 and 25 in the cylinders 10 and 11 that the fluid passing from the inlet port through the chambers and the cylinders to the outlet port actuates the pistons, and through the pistons operates an indicating or counting device which translates the displacement of the pistons into an indication of the volume of fluid passing from the inlet to the outlet ports.

The pistons are identical in construction and each is centrally and transversely divided by a partition wall 26. Each piston is formed with four ports indicated by the numerals 27, 28, 29, and 30. The ports are formed through the peripheral wall of the piston and the ports 27 and 29 are in communication with one end of the piston, while the ports 28 and 30 communicate with the opposite end of the piston. The ports of the piston are so formed, however, that they extend the full length of the piston without forming communication between the interiors of the opposite ends of the piston. At the time when the ports 27 and 29 are in register with the intake ports of the cylinder, the other two ports 28 and 30 will be in register with the discharge ports of the cylinder. However, the operation of the piston is such that upon each alternate cycle of operation the ports 28 and 30 will register with the intake ports in the cylinder and the ports 27 and 29 will register with the outlet ports thereof.

It is obvious, of course, that this arrangement of ports causes the incoming fluid to move the piston axially so as to displace the fluid in the opposite end of the piston, which fluid will discharge into the outlet chambers 21 and 22, and upon reaching the end of that stroke the operation will be reversed in that fluid will be delivered to the opposite end of the piston and move the same in the opposite direction.

In order to operate the pistons so as to accomplish this registration of the ports, the pistons are oscillated while they are being reciprocated, which oscillation is so timed relative to the reciprocating strokes of the pistons that the ports in the pistons properly register with the ports in the cylinders so that the fluid passing into the inlet chamber of the meter casing will cause the pistons to reciprocate.

For this purpose each piston is fitted with a radial crank arm 33 which is connected with a rotatable synchronizer 34, which synchronizer is in the form of a flat disk rotatably mounted in an anti-friction bearing 36 carried by a bracket 37 suspended within the intake chamber 19 centrally between the two cylinders 10 and 11. The longitudinal axis of the rotatable synchronizer 34 is disposed at right angles to the longitudinal axes of the cylinders 10 and 11, although the center of this synchronizer 34 is disposed on the same plane as the centers of the cylinders 10 and 11.

Rotatably mounted in the synchronizer 34 at eccentric points thereon are two bushings 38. These bushings are arranged at ninety degrees apart but their centers are positioned equal distances from the center of the synchronizer 34. Each bushing is provided with a bore or socket 39 eccentrically formed therein so that by revolving the bushing in the synchronizer 34, the distance between the bore or socket 39 and the center of the synchronizer 34 may be varied. The crank arms 33 of the pistons 24 and 25 rotatably and slidably engage the sockets 39 of the bushings 38, so that when the pistons reciprocate, the synchronizer 34 will be rotated due to the connection between the crank arms 33 and the synchronizer, which rotation will cause the pistons to oscillate and effect the proper registration of the inlet and outlet ports thereof with the inlet and outlet ports of the cylinders 10 and 11.

Obviously by revolving the bushings 38 in the synchronizer 34, the diameter of the circle about which the crank arms 33 travel will be varied, and consequently the strokes of the pistons will be varied. It is by this means that the displacement of the pistons can be changed for purposes of calibration.

To effect this adjustment, each of the adjustment bushings 38 is formed with a spur gear 40 disposed at one side of the rotatable synchronizer 34. These gears 40 mesh with a gear 41 formed on a bushing 42 rotatably mounted in the rotatable synchronizer 34 concentrically therewith. At the side of the synchronizer 34 opposite the gears 40 and 41, the bushing 42 is connected with a spur gear 43 of a large diameter. This gear 43 is not secured to the synchronizer 34 so that it may be rotated relative thereto so as to rotate the bushing 42 and thus revolve the gears 40 through the medium of the gear 41. It is obvious that by revolving the gears 40 through the medium of the gear 41 that the adjustment bushings 38 will be simultaneously and equally revolved so as to simultaneously adjust the strokes of both the pistons 24 and 25 an equal amount. At the side of the synchronizer opposite the gear 43 is a similar gear 44 which is secured to the synchronizer 34 so as to rotate therewith.

To operate the gear 43 to effect the adjustment, we provide an adjusting pinion 45 mounted in the bracket 37 in a position to simultaneously mesh with the gears 43 and 44. The pinion 45 is mounted at right angles to the gears 43 and 44 as illustrated most clearly in Fig. 2. This pinion is slidably and rotatably mounted in a socket 46 carried by the bracket 37, and a spring 47 normally tends to maintain the pinion 45 out of mesh with the gears 43 and 44.

To operate the adjustment pinion 45, we provide an operating shaft 48 which extends laterally outward through the meter casing to a point at the exterior thereof, a gland 49 being provided for the purpose of preventing leakage thereabout. At the outer end of the meter a calibrated dial 50 is mounted eccentrically about the adjustment shaft 48. A knob 51 is fitted to the outer end of the shaft 48 having a pointer 52 to cooperate with the dial 50. The dial and knob 51 are enclosed in a hinged cap 53 which is hinged to the outer face of the meter casing as illustrated most clearly in Fig. 5. This cap may be sealed in closed position, if so desired, and for this purpose we have provided the cooperating lugs 54 and 55 on the meter casing and cap.

By pressing inwardly on the knob 51, the pinion 45 will be moved against the action of the spring 47 and placed in mesh with both of the gears 43 and 44; then by turning the knob, the gear 43 will be moved relative to the gear 44 and the synchronizer 34 which will impart rotation to the bushing 42 and turn the gear 41. As this gear is in mesh with the gears 40, the latter will be turned to rotate the bushings 38. Inasmuch as the sockets or bores 39 of these bushings are eccentrically positioned therein, their rotation will change the relative positions between these sockets and the center of rotation of the synchronizer 34. This, as previously described, will vary the strokes of the pistons and change the displacement thereof.

The meter is fitted with a counting or indicating mechanism 56 driven by a counter drive shaft 57. This counter drive shaft is driven from the synchronizer 34 through the gear 44. The latter gear, as will be seen from Figs. 1 and 2, drives a gear 58 which, through a gear train 59, drives an intermediate shaft 60. This shaft drives the counter drive shaft 57 through the medium of a gear train 61.

In operation of the device, when fluid is delivered to the meter, it will impart reciprocation to the pistons 24 and 25. As these pistons commence to reciprocate, they will be caused to oscillate through the medium of the connection between the crank arms 33 and the rotatable synchronizer 34, and consequently cause rotation of the synchronizer 34. The distance between the center of rotation of the synchronizer 34 and the point of connection between the cranks 33 of the synchronizer will determine the effective strokes of the pistons and consequently the displacement thereof. Inasmuch as these cranks are connected to the synchronizer 34 at points ninety degrees apart, the pistons will operate in overlapping cycles essential to a meter of this character.

If it is desired to calibrate the meter, the cap 53 is unsealed and opened and the knob 51 is pressed inwardly which causes engagement of the pinion 45 with the gears 43 and 44. The knob 51 is then turned to turn the shaft 48 so as to cause rotation of the gear 43 relative to the gear 44 and the synchronizer 34. This will impart rotation to the gear 41 through the medium of the bushing 42 and will consequently revolve the gears 40. As these gears are fixed to the bushings 38, the latter will be turned in the synchronizer 34 to vary the distance between the point of connection of the crank arms with the synchronizer and the center of rotation of the synchronizer. This, of course, will vary the strokes of the pistons and consequently vary the displacement thereof.

From the foregoing it is seen that we have provided a very efficient meter which may be calibrated from the exterior of its casing. That is to say, by merely opening the cap 53, the adjustment may be accomplished. The amount of the adjustment may be determined by the provision of the pointer 52 and the calibrations on the dial 50.

While we have shown the preferred form of our invention, it is to be understood that various changes may be made in its construction by those skilled in the art without departing from the spirit of the invention as defined in the appended claims.

Having thus described our invention, what we claim and desire to secure by Letters Patent is:

1. In combination with a fluid meter of the character described including a meter casing having a pair of cylinders therein, a piston mounted for reciprocation and oscillation in each cylinder, a rotary member within said casing, an arm on each of said pistons connected to said rotary member at an eccentric point thereon whereby reciprocation of the pistons will cause oscillation of the same and revolve the rotary member, and means operable from the exterior of said casing for varying the distance between the center of rotation of said rotary member and the points of connection between said arms and said rotary member.

2. In combination with a fluid meter of the character described including a meter casing having a pair of spaced parallel cylinders therein, a piston in each cylinder mounted for reciprocation and oscillation, a rotary member arranged intermediate the cylinders within the casing on an axis disposed at right angles to the axes of said cylinders, an arm on each of said pistons, said arms being connected to said rotary member at eccentric points thereon with respect to the center of rotation of said member, and means operable from the exterior of the casing for varying the distance between the center of rotation of said rotary member and the points of connection between said arms and said rotary member.

3. In combination with a fluid meter of the character described including a meter casing having a pair of cylinders formed therein, a piston mounted for reciprocation and oscillation in each cylinder, a rotary member mounted within the casing for rotation about an axis disposed at right angles to the axes of said cylinders, a pair of bushings rotatably mounted in said rotary member at eccentric points thereon, said bushings having eccentric sockets formed therein, an arm on each piston engaging one of said sockets whereby reciprocation of the pistons will oscillate the same and revolve the rotary member, and means operable from the exterior of said casing for revolving said bushings relative to said rotary member whereby to vary the distance between said sockets and the center of rotation of said rotary member.

4. In combination with a fluid meter of the character described including a meter casing having a pair of parallel cylinders formed therein, a piston mounted for reciprocation and oscillation in each cylinder, a rotary member revolubly mounted within the casing between the cylinders for rotation on an axis disposed at right angles to the axes of said cylinders, a pair of bushings revolubly mounted in said rotary member at eccentric points thereon and relatively spaced circumferentially of the rotary member, a gear fixed to each bushing, a socket formed in each bushing in an eccentric position thereon, an arm on each piston engaging one of said sockets whereby reciprocation of said pistons will oscillate the same and revolve the rotary member, a gear arranged concentrically with the rotary member and engaging the gears on said bushings, and means operable from the exterior of the casing for imparting rotation to said concentric gear to turn said bushings and thereby adjust the strokes of said pistons.

5. In combination with a fluid meter of the character described including a meter casing having a pair of parallel cylinders formed therein, a piston mounted for reciprocation and oscillation in each cylinder, a rotary member revolubly mounted within the casing between the cylinders for rotation on an axis disposed at right angles to the axes of said cylinders, a pair of bushings revolubly mounted in said rotary member at eccentric points thereon and relatively spaced circumferentially of the rotary member, a gear fixed to each bushing, a socket formed in each bushing in an eccentric position thereon, an arm on each piston engaging one of said sockets whereby reciprocation of said pistons will oscillate the same and revolve the rotary member, a gear arranged concentrically with the rotary member and engaging the gears on said bushings, a gear normally revoluble with said rotary member and relatively fixed to said concentric gear, a pinion normally out of engagement with the last-named gear, means operable from the exterior of the casing for placing said pinion in engagement with said gear and rotating the same to effect adjustment of said bushings.

6. In combination with a fluid meter of the character described including a meter casing having a pair of parallel cylinders formed therein, a piston mounted for reciprocation and oscillation in each cylinder, a rotary member revolubly mounted within the casing between the cylinders for rotation on an axis disposed at right angles to the axes of said cylinders, a pair of bushings revolubly mounted in said rotary member at eccentric points thereon and relatively spaced circumferentially of the rotary member, a gear fixed to each bushing, a socket formed in each bushing in an eccentric position thereon, an arm on each piston engaging one of said sockets whereby reciprocation of said pistons will oscillate the same and revolve the rotary member, a gear arranged concentrically with the rotary member and engaging the gears on said bushings, means operable from the exterior of the casing for imparting rotation to said concentric gear to turn said bushings and thereby adjust the strokes of said pistons, a counter drive gear fixed to said rotary member, a counter mechanism, and a driving connection between said counter drive gear and said counter mechanism.

7. In combination with a fluid meter of the character described including a meter casing having a pair of cylinders formed therein, a piston mounted for reciprocation and oscillation in each cylinder, a rotary member revolubly mounted within the casing, an arm on each piston, said arms being connected to said rotary member at eccentric points thereon whereby reciprocation of the pistons will revolve the rotary member and oscillate the pistons, means operable from the exterior of said casing for varying the distance between the center of rotation of said rotary member and the points of connection between the said arms and the said rotary member, a counter mechanism and a driving connection between the counter mechanism and said rotary member for operating the counter mechanism.

GEORGE F. BURNETT.
HOWARD E. WARD.